United States Patent
Robinson et al.

(10) Patent No.: US 12,357,525 B2
(45) Date of Patent: Jul. 15, 2025

(54) PET MOBILITY CARRIER ASSEMBLY

(71) Applicant: WALKIN PETS INC., Amherst, NH (US)

(72) Inventors: Mark C. Robinson, Amherst, NH (US); James Jones, Derry, NH (US)

(*) Notice: Subject to any disclaimer, the term of this patent is extended or adjusted under 35 U.S.C. 154(b) by 0 days.

(21) Appl. No.: 18/650,202

(22) Filed: Apr. 30, 2024

(65) Prior Publication Data

US 2024/0277554 A1    Aug. 22, 2024

Related U.S. Application Data

(63) Continuation of application No. 17/256,289, filed as application No. PCT/US2019/022003 on Mar. 13, 2019, now Pat. No. 11,969,390.

(51) Int. Cl.
*A61H 3/04* (2006.01)
*A01K 29/00* (2006.01)

(52) U.S. Cl.
CPC .............. *A61H 3/04* (2013.01); *A01K 29/00* (2013.01); *A61H 2203/03* (2013.01)

(58) Field of Classification Search
CPC ...... A61H 3/04; A61H 2203/03; A01K 29/00; A61D 3/00
See application file for complete search history.

(56) References Cited

U.S. PATENT DOCUMENTS

| | | | |
|---|---|---|---|
| 3,215,117 A | 11/1965 | Short | |
| 3,406,661 A | 10/1968 | Parkes | |
| 4,375,203 A | 3/1983 | Parkes | |
| 4,821,676 A | 4/1989 | Hulterstrum | |
| 5,224,444 A | 7/1993 | Hill et al. | |
| 5,555,847 A * | 9/1996 | Kelly | |
| 6,820,572 B1 | 11/2004 | Parkes | |
| 7,549,398 B2 | 6/2009 | Robinson et al. | |
| 8,919,291 B2 | 12/2014 | De La Celle et al. | |
| 9,179,646 B2 * | 11/2015 | Shalom | |
| 10,765,087 B1 | 9/2020 | Massey et al. | |
| 11,969,390 B2 | 4/2024 | Robinson et al. | |
| 2007/0216122 A1 | 9/2007 | Cornelius et al. | |
| 2010/0206243 A1 | 8/2010 | Caiozzo | |

(Continued)

FOREIGN PATENT DOCUMENTS

| | | | | |
|---|---|---|---|---|
| CN | 106806042 A | * | 6/2017 | ............... A61F 2/60 |
| JP | 2005229947 A | | 9/2005 | |

(Continued)

OTHER PUBLICATIONS

International Search Report and Written Opinion for International (PCT) Patent Application No. PCT/US2019/022003, dated Dec. 11, 2019, 8 pages.

(Continued)

*Primary Examiner* — James A Shriver, II
*Assistant Examiner* — Nicholas R. Kandas
(74) *Attorney, Agent, or Firm* — Sheridan Ross P.C.

(57) ABSTRACT

A pet mobility carrier assembly for a disabled animal having either a rear leg disability or a front leg disability. The assembly includes a carrier base with a perimeter surface, a carrier animal support removably disposed on the carrier base, and at least three rollers connected to the carrier base that provides multi-directional movement to the pet mobility carrier assembly when on a floor.

26 Claims, 9 Drawing Sheets

(56) References Cited

U.S. PATENT DOCUMENTS

2017/0143575 A1     5/2017  Heinrich et al.
2019/0209417 A1*    7/2019  Laicheng

FOREIGN PATENT DOCUMENTS

| JP | 3141836       | 5/2008  |
| JP | 2014135929 A  | 7/2014  |
| JP | 1520711       | 3/2015  |
| JP | 2017209093 A  | 11/2017 |
| KR | 20160095915 A | 8/2016  |

OTHER PUBLICATIONS

Official Action (with English summary) for Japan Patent Application No. 2021-555411, dated Nov. 12, 2024, 28 pages.
Official Action for U.S. Appl. No. 17/256,289, dated Aug. 22, 2023, 7 pages. Restriction Requirement.
Notice of Allowance for U.S. Appl. No. 17/256,289, dated Jan. 19, 2024, 10 pages.
Notice of Allowance for U.S. Appl. No. 17/256,289, dated Feb. 9, 2024, 7 pages.

* cited by examiner

PET MOBILITY CARRIER ASSEMBLY

CROSS-REFERENCE TO RELATED APPLICATIONS

This patent application is a Continuation of U.S. patent application Ser. No. 17/256,289, filed on Dec. 28, 2020, which is a national stage entry under 35 U.S.C. § 371 of PCT International Patent Application No. PCT/US2019/022003, filed on Mar. 13, 2019. Each of these applications is herein incorporated by reference in its entirety.

FIELD OF THE INVENTION

The present invention relates generally to walking aids for animals. Particularly, the present invention relates to mobile devices for disabled animals. More particularly, the present invention relates to mobile devices for injured or partially-immobilized animals such as cats and dogs.

DESCRIPTION OF THE PRIOR ART

Many dogs and cats lose the use of their front or hind legs through injury, illness, age, or obesity. Disabling medical conditions include inherited degenerative disorders, disc rupture and primary diseases of the nervous system. Unable to walk, romp about, or exercise, the animal often becomes lethargic giving rise to additional health and care problems. This is a terrible experience for the pet owner.

To address these concerns, many animal slings, supports and carts have been developed in the past. U.S. Pat. No. 7,549,398 (2009, Robinson et al.) discloses a wheelchair for animals that includes a harness support frame having first and second lateral supports spaced from each other and a width extender adjustably connected between the first and second lateral supports, first and second knuckle clamp assemblies where each one of the first and second knuckle clamp assemblies has a first clamp component and a second clamp component, a plurality of harness connectors attached to the harness support frame, first and second leg assemblies where the second clamp components receives a leg assembly proximal end of one of the first and second leg assemblies, first and second wheels where each one of the first and second wheels is rotatably connected adjacent to a leg assembly distal end of one of the first and second leg assemblies, and a harness assembly detachably connected to the harness support frame. Each first clamp component has a lateral bore for receiving one of the first and second lateral supports therethrough and is positioned between a support frame proximal end and a support frame distal end. Each second clamp component has a clamp recess that receives the leg assembly proximal end and is rotatably and adjustably connected to the corresponding first clamp component.

U.S. Pat. No. 6,820,572 (2004, Parkes) discloses a prosthetic apparatus for disabled four-legged animals. The apparatus is a cart with a chassis. The chassis includes a front subassembly detachably mounted to a rearward subassembly. A primary wheel is mounted to the frame of the chassis at each side of the rearward end and a set of swively mounted secondary wheels is mounted to the frame at each side of the forward end. A yoke extends across the frame at the forward end and is movable from an active position spanning the side walls of the frame to an inactive position away from one of the side walls to permit entrance and exit of the animal from the cart.

U.S. Pat. No. 5,224,444 (1993, Hill et al.) discloses a walking aid for a four-legged animal. The walking aid includes a cradle attachable below the animal's hind quarters, and a support member pivotally attached to the cradle. A wheel arrangement is provided on the support member at its end remote from the cradle. Resiliency is provided for biasing the support member below the cradle.

U.S. Pat. No. 4,821,676 (1989, Hulterstrum) discloses a cart assembly for a partially-immobilized animal. The cart assembly includes a plastic cradle adapted to support and partially encompass the hind portion of the animal, wheels connected to the plastic cradle for mobility, and a harness that is secured over the head of the animal and secured to the cradle.

U.S. Pat. No. 4,375,203 (1983, Parkes) discloses a prosthetic cart for animals. The cart has a yoke attachable to the animal's thorax, a hip support member for carrying the animal's rear quarters, a shin support for the animal's rear legs, and a pair of wheels. The cart also includes a pair of adjustment blocks that each has a plurality of axle holes. The axle is positioned with respect to the cart to approximate a balanced support of the rear quarters.

U.S. Pat. No. 3,406,661 (1968, Parkes) discloses an apparatus for suspending the hindquarters of a crippled household pet. The apparatus includes a standard formed of spaced shafts interconnected adjacent their upper ends and rotatably mounting a wheeled axle adjacent their lower ends, an upper and lower clamp device for each shaft, a shoulder unit formed of spaced parallel shafts having an integrally formed front yoke for embracing the shoulder area and providing spaced rear ends, and a suspension unit formed of spaced parallel shafts having an integrally formed lower abdominal sling merging into a pair of rear leg loops.

U.S. Pat. No. 3,215,117 (1965, Short) discloses a veterinary paraplegic cart. The cart includes an inverted U-shaped frame, wheels mounted on the frame, a shaped saddle bar adjustably secured to the frame, a preformed saddle secured to the saddle bar, a horizontal bar fitted to the front body area of the animal, rearwardly extending elongated rods with a fastening mechanism that is detachably connected to the horizontal bar and connected to the frame.

SUMMARY OF THE INVENTION

The prior art devices all suffer from various disadvantages. Some of the prior art devices must be made to order and custom designed to the measurements of the animal. Some of the prior art devices can be adjusted based on the height and length of the animal but the wheel legs cannot be angularly adjusted relative to the horizontal axis of the device. Still others allow the wheel legs to be angularly adjusted relative to the horizontal axis of the device. The biggest issue, however, is the size of the devices. These are made for outdoor use and are not very practical for use in the home. Further, because some of the prior art devices are custom-made, prior art carts cannot be returned or used on another animal unless the other animal has the same height, length and width measurements as the original animal for which the cart was made. In addition, the prior art carts tend to be bulky and more difficult to transport.

It is an object of the present invention to provide an apparatus that is smaller than prior art pet wheelchairs and carts, has a lower profile and is more furniture friendly for use in the home without the clumsiness of the prior art devices.

It is another object of the present invention to provide an apparatus that allows the disabled animal to move more quickly within the home.

The present invention achieves these and other objectives by providing, in one embodiment, a pet mobility carrier assembly for a disabled animal having either a rear leg disability or a front leg disability. The assembly includes a carrier base with a perimeter surface, a carrier animal support removably disposed on the carrier base, and at least three rollers connected to the carrier base that provides multi-directional movement to the pet mobility carrier assembly when on a floor.

In another embodiment, the pet mobility carrier assembly further includes one of a rear animal leg drag bag or a front animal harness where each of the rear animal leg drag bag and the front animal harness is removably attached to the carrier base for securely maintaining attachment of the pet carrier assembly to the four-legged animal.

In one embodiment of the present invention, the carrier base has a base front end, a base back end, a base top, and a base bottom. It is noted that the terms base front end and base back end do not indicate whether the terms correlate to the front and back of the disabled animal but are only used to differentiate between the two ends of the carrier base.

In another embodiment of the present invention, the base perimeter surface includes a base recess portion to accommodate movement of the non-disabled front or rear legs of the animal.

In a further embodiment, the base perimeter surface includes at least two releasable attachment points adapted to secure a portion of a four-legged animal to the pet mobility carrier assembly.

In another embodiment, the carrier animal support is a pad.

In another aspect of the invention, the carrier animal support is one of a foam pad or a foam pad fixedly attached to an animal support base of the carrier animal support.

In still another embodiment, the base recess portion is arcuate shaped and adapted to allow a four-legged animal's non-disabled front legs or a four-legged animal's non-disabled rear legs to step forward or backward causing the pet mobility carrier assembly to move in a similar direction.

In another embodiment, the carrier animal support includes a releasable fastener assembly between the carrier base top and the carrier animal support.

In a further embodiment, the rollers are multi-directional rollers that permit movement of the carrier base to roll in all directions when propelled by the disabled animal.

In another aspect of the present invention, there is disclosed a method to provide mobility for a disabled animal having either disabled front legs and non-disabled rear legs or disabled rear legs and non-disabled front legs. The method includes providing a low form pet mobility carrier assembly having (a) a carrier base, (b) a carrier animal support disposed on the carrier base, and (3) at least three rollers connected to the carrier base, placing either the disabled front legs or the disabled rear legs of the disabled animal on the low form pet mobility carrier assembly, and securing the respective one of the disabled front legs or the disabled rear legs to the low form pet mobility carrier assembly where the disabled animal is capable of propelling itself across a surface using the non-disabled rear legs or the non-disabled front legs, respectively.

In another embodiment of the method, the providing step includes providing one of a rear animal leg drag bag or a front animal harness wherein the one of the rear animal leg drag bag and the front animal harness is removably attached to the low form pet mobility carrier assembly to securely attach and support the disabled animal on the low form pet mobility carrier assembly.

In a further embodiment of the method, the providing step includes providing a pad that is formed into the carrier animal support.

In another embodiment of the method, the providing step includes providing the carrier animal support that is one of a foam pad removably attachable to the carrier base or a foam pad fixedly attached to the carrier base.

In yet another embodiment of the method, the providing step includes forming a recess portion that is arcuate shaped into a perimeter portion of the carrier base.

In still another embodiment of the method, the providing step includes fixedly attaching a releasable fastener assembly between the carrier base and the carrier animal support. One part of the releasable fastener assembly is secured to the carrier base and the other part of the releasable fastener assembly is secured to the carrier animal support.

In another embodiment of the method, the providing step includes selecting multi-direction rollers as the at least three rollers.

In another embodiment of the method, the providing step includes selecting the carrier base having at least two releasable attachment points connected to the carrier base.

In another embodiment of the method, the providing step includes selecting the carrier base having rotatable button lock fasteners as the at least two releasable attachment points.

DETAILED DESCRIPTION OF THE INVENTION

Figure 1:
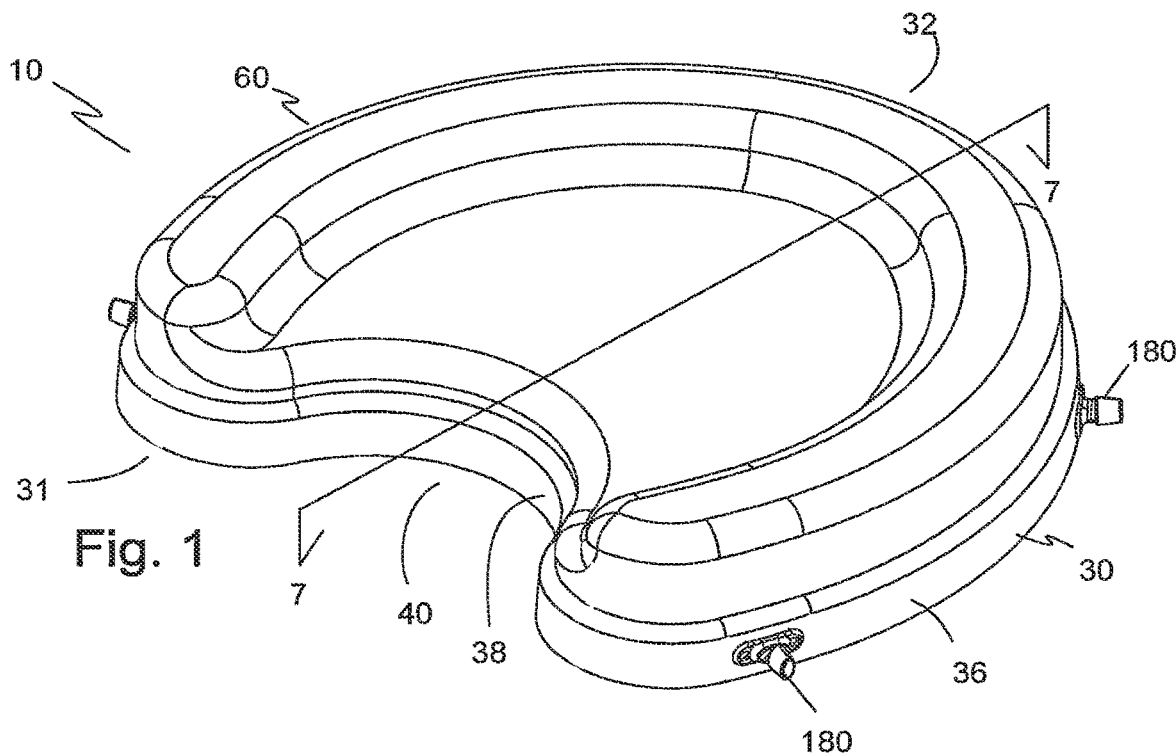
FIG. 1 is a front, left perspective view of one embodiment of the present invention showing a pet mobility carrier assembly.
Figure 2:
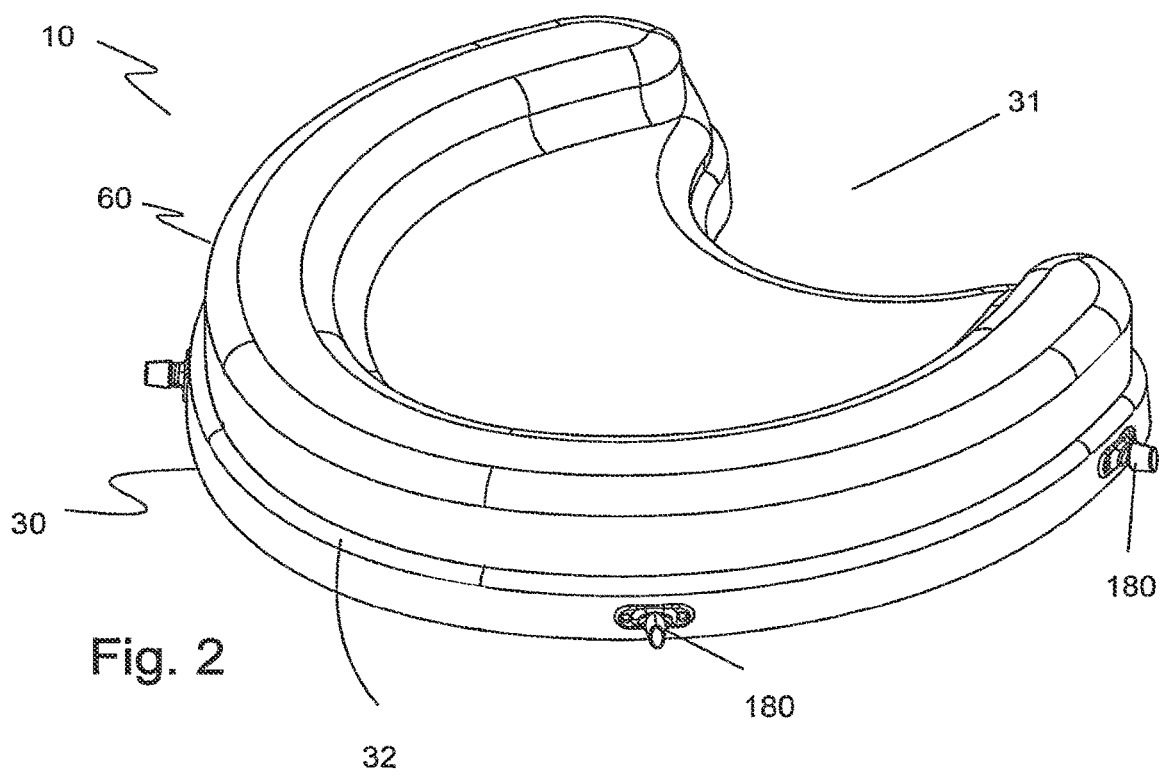
FIG. 2 is a rear, right perspective view of the embodiment of FIG. 1.

The embodiments of the present invention are illustrated in FIGS. 1-16. FIGS. 1 and 2 show one embodiment of pet mobility carrier assembly 10. FIG. 1 is a front, left perspective view and FIG. 2 is a rear right perspective view. Pet mobility carrier assembly 10 includes a carrier base 30, a carrier animal support 60 and at least three rollers 90 (rollers are shown in FIG. 8). Carrier animal support 60 is connected to carrier base 30 and provides a surface upon which disabled rear legs of a disabled animal is positioned. The at least three rollers 90 are connected to the bottom of carrier base 30 and allows pet mobility carrier assembly 10 to move across a surface such as, for example, a floor. On a base perimeter surface 36, there is disposed a plurality of releasable attachment points 180 used to secure a disabled animal to pet mobility carrier assembly 10.

In this embodiment of carrier animal support 60, carrier animal support 60 has a raised berm 70 around a portion of a periphery of carrier animal support 60, which defines a space 72 within a central portion 61 of carrier animal support 60 for receiving the disabled rear legs of the disabled animal. It is understood that raised berm 70 is not necessary to the functioning of carrier animal support 60 and a flat, planar surface would also suffice. On a front end 31 of carrier base 30 is a base recess portion 40 that typically has a radius R1 and an arc distance or chord length to accommodate the non-disabled front legs or the non-disabled rear legs of the disabled animal when the disabled animal walks thereby moving pet mobility carrier assembly 10.

Figure 3:
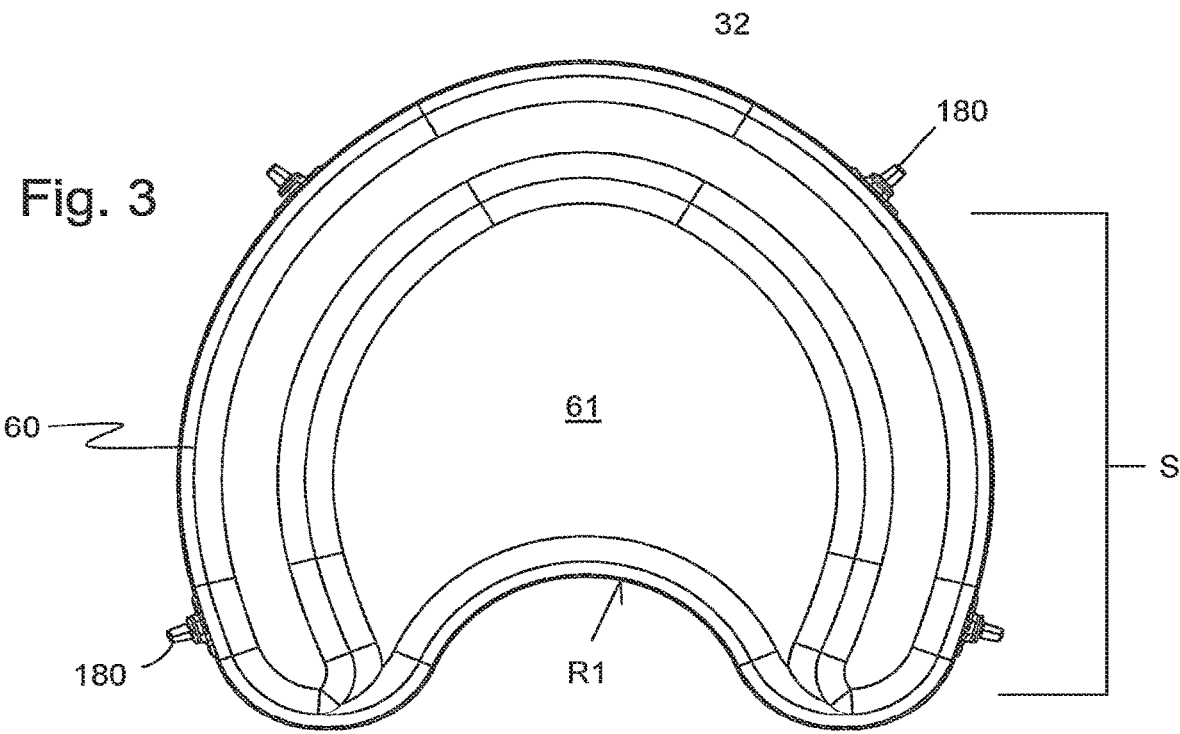
FIG. 3 is a top view of the embodiment of FIG. 1.

FIG. 3 is a top view of pet mobility carrier assembly 10. As can be seen in this embodiment, the peripheral shape of carrier base 30 has an arcuate, convex shape and base recess portion 40 has an arcuate, concave shape. As is evident in this embodiment, carrier animal support 60 has a similar shape as carrier base 30. The similarity of the shapes is not important or critical to the present invention. For example, the sides as indicated by the area S may be parallel to each other along a major portion of the periphery between front end 31 and back end 32. Furthermore, back end 32 may be arcuate, multi-sided or perpendicular to sides S.

Figure 4:
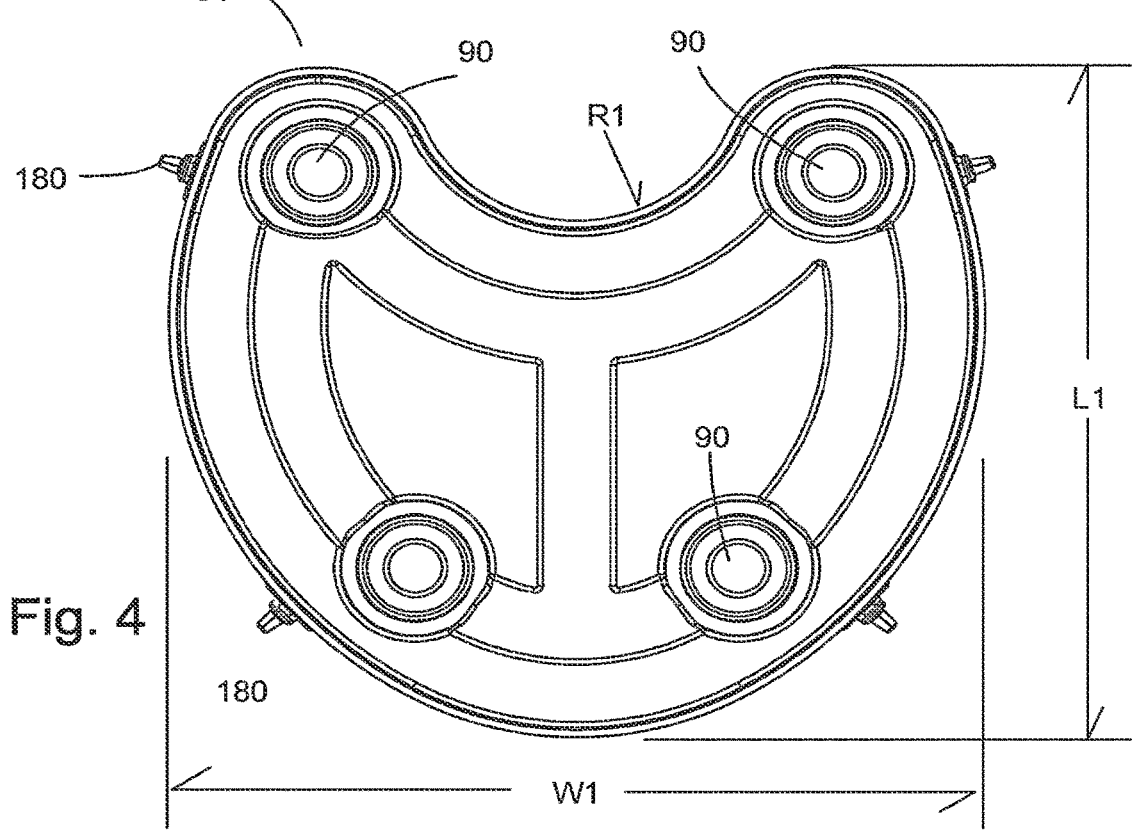
FIG. 4 is a bottom view of the embodiment of FIG. 1.

FIG. 4 is a bottom view of pet mobility carrier assembly 10. In this embodiment, there are 4 rollers connected to base carrier 30. The features appearing to connect between rollers 90 are simply features caused by the molds for injection molding and are not critical features of base carrier 30. In fact, a flat, planar surface could be used to which rollers 90 are attached. In both views of FIGS. 3 and 4, it is shown that four releasable attachment points 180 are incorporated. The attachment points 180 are typically positioned along the base perimeter portion 38 in locations that are best suited for attaching a disabled animal to pet mobility carrier assembly 10. In this embodiment, carrier base 30 has a length L1 in a range of about thirteen inches to about twenty inches (about 33 cm to about 51 cm) and a width W1 in a range of about twelve inches to about twenty inches (about 30.5 cm to about 51 cm). It is understood that these thickness dimensions are not limiting but may be varied depending on the size and weight of the disabled animal. Base recess portion 40 of carrier base 30 has a radius R1 in a range of about two and a half inches to about four inches (about 6.4 cm to about 10.2 cm), and preferably in a range of about three inches to about four inches (about 7.6 cm to about 10.2 cm). It is understood that these radial dimensions for the base recess portion 40 are not limiting but may be varied depending on the size and weight of the disabled animal, the length of the stride and the distance between the non-disabled legs of the disabled animal.

Figure 5:
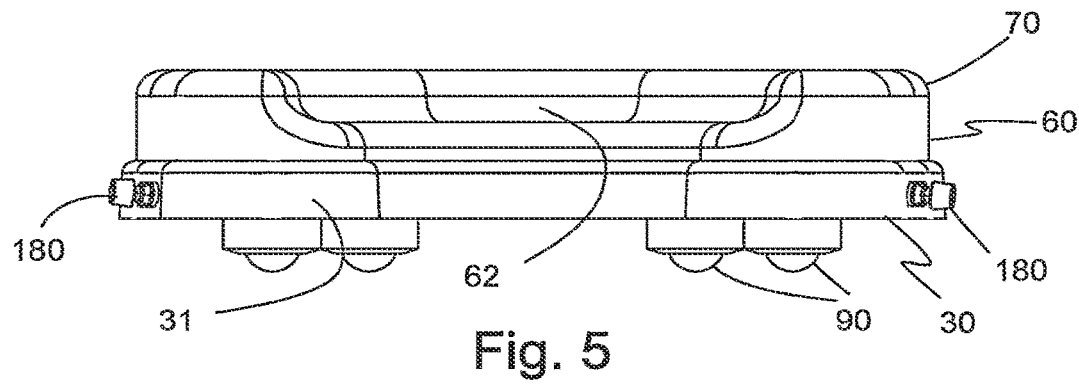
FIG. 5 is a front view of the embodiment of FIG. 1.
Figure 6:
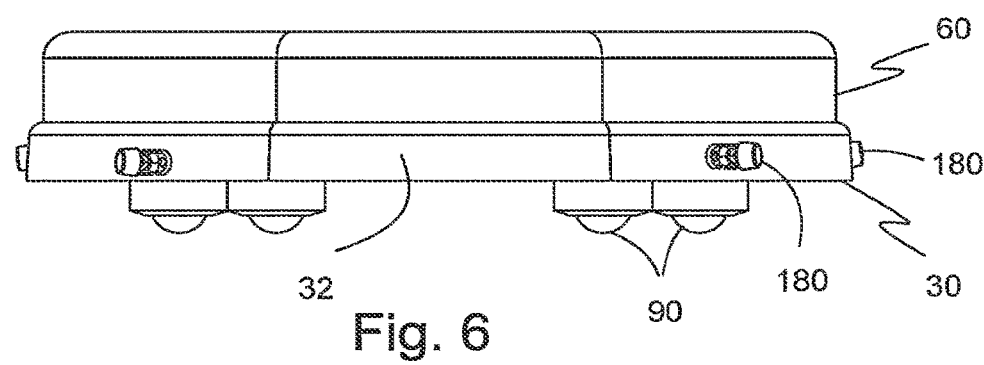
FIG. 6 is a rear view of the embodiment of FIG. 1.
Figure 7:
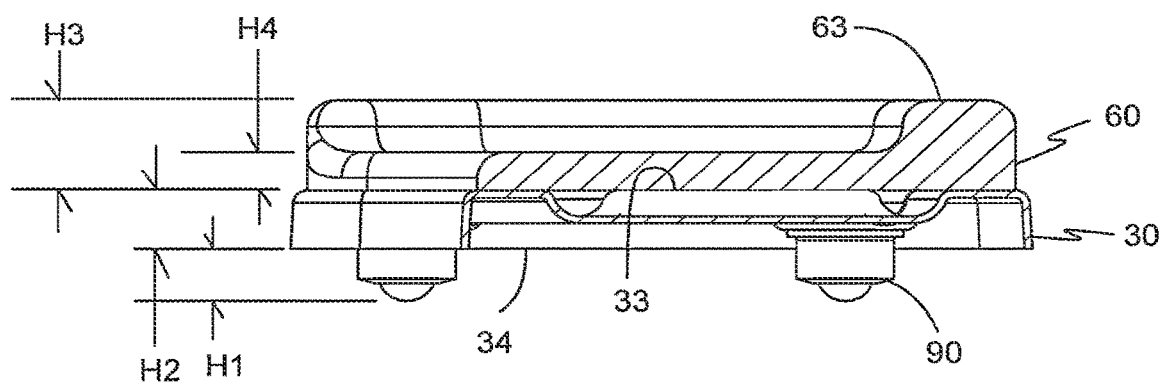
FIG. 7 is a cross-sectional left side view of the embodiment of FIG. 1 taken along line 7-7.
Figure 8:
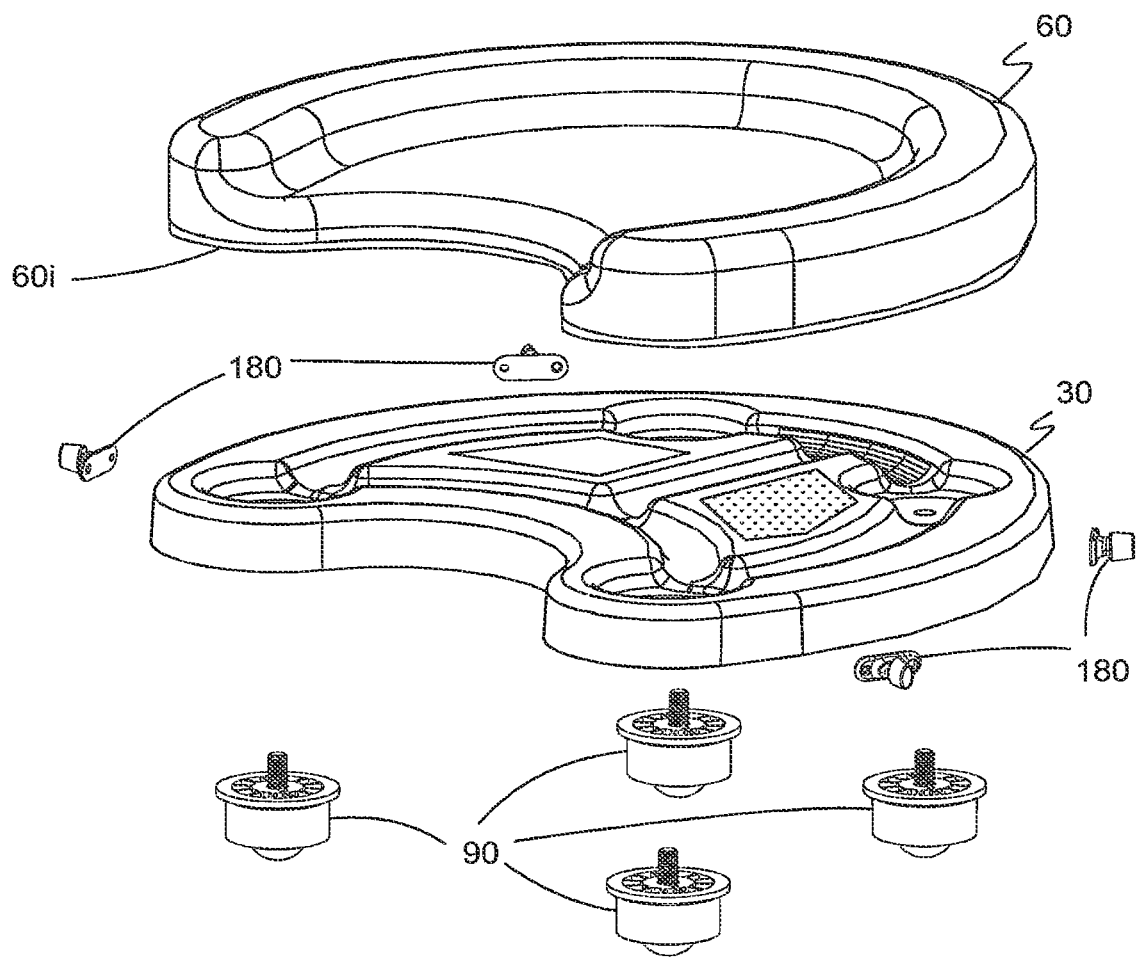
FIG. 8 is an exploded view of the embodiment of FIG. 1.

FIGS. 5, 6 and 7 are a front view, a rear view and a cross-sectional view of pet mobility carrier assembly 10, respectively. In the front view of FIG. 5, it is shown that raised berm 70 does not completely surround central portion 61 but delineates an open portion 62 that communicates with space 72 bounded by raised berm 70 from which the main body of the disabled animal extends toward the disabled animal's non-disabled front legs. Raised berm 70 helps retain the disabled rear legs or hind quarters on the pet mobility carrier assembly 10 as the disabled animal moves along a floor. It is understood that the use of pet mobility carrier assembly 10 with its plurality of rollers 90 compared to a drag bag alone greatly reduces friction against a floor allowing the disabled animal greater mobility with much less effort on the part of the disabled animal. The pair of front releasable attachment points 180 are shown to which a restraining assembly is removably secured to front end 31 of carrier base 30. As shown in FIG. 5 and FIG. 4, the rollers 90 at front end 31 are spaced wider apart than rollers 90 at back end 31. This arrangement provides greater stability to pet mobility carrier assembly 10 when connected to a disabled animal where a greater portion of the animal's non-disabled body extends from carrier assembly 10 while providing carrier base 31 with a more streamlined cross-section for movement along a planar surface such as a floor where there is likely other obstacles on the floor that could create impediments to the animal's mobility.

From back end view of FIG. 6, the pair of rear releasable attachment points 180 are shown to which a restraining assembly is removably secured to back end 31 of carrier base 30.

Turning now to FIG. 7, the cross-sectional view taken along line 7-7 in FIG. 1 shows the cross-sectional shape of carrier animal support 60 as well as cross-sectional view of carrier base 30 that is one design for an injection molded piece. Even more notable is the low form profile of pet mobility carrier assembly 10. As shown in FIG. 7, the height H1 in this embodiment between a surface upon which rollers 90 rest and a base bottom 34 of carrier base 30 (also called the clearance height) is about one inch (about 2.54 cm). The thickness H2 of carrier base 30 between carrier base bottom 34 and a carrier base top 33 is also about one inch (about 2.54 cm). The thickness H3 of carrier animal support 60 between a carrier support bottom 64 and a carrier support top 63 is about 1.75 inches (about 4.4-4.5 cm). Thickness H3 includes raised berm 70. The thickness H4 of central portion 61 of carrier animal support 60 is about three-quarters of an inch (about 1.9 cm). It is understood that these thickness dimensions are not limiting but may be varied depending on the size and weight of the disabled animal.

Turning now to FIG. 8, there is illustrated an exploded view of pet mobility carrier assembly 10 of FIG. 1. Carrier base 30 may be made of any rigid material such as, for example, metal or plastic or composite materials or combinations thereof but an injection molded plastic is the more economical choice for large quantities and customer pricing. Base top 33 may be completely planar or have planar portions for supporting carrier animal support 60. In the embodiment illustrated, the channels shown are a result of the mold used for injection molding carrier base 30 and the roller recesses are provided for attachment structure to retain rollers 90 to carrier base 30 while not interfering with carrier animal support 60 when carrier animal support 60 is connected to carrier base 30. Carrier animal support 60 may be made of a cushioning material such as, for example, a foam pad or a foam pad fixedly attached to a rigid support base 60*i* as shown in FIG. 8B. Carrier animal support 60 may be fixedly attached to base top surface 33 or may be removably connected to base top surface 33. For easier cleaning or replacement of carrier animal support 60, a releasable fastener assembly 60*h* is connected between carrier base 30 and carrier animal support 60. A usable releasable fastener assembly 60*h* includes, but is not limited to, a hook and loop fastener, a snap, a quick-release fastener, a reusable double-sided tape, and the like. The at least three rollers 180 may be any known multi-directional rollers such as, for example, pivoting wheels, omni-directional wheels/rollers, and the like. Rollers 180 are secured to base bottom 34 but may be removable for replacement or cleaning. Releasable attachment points 180 are fixed to base perimeter surface 36 of carrier base 30. Releasable attachment points 180 may be any known releasable fasteners such as, for example, snaps, buttons, buckles, clips and O-rings, hook and loop fastener, twist-lock fasteners, etc.

Figure 9:
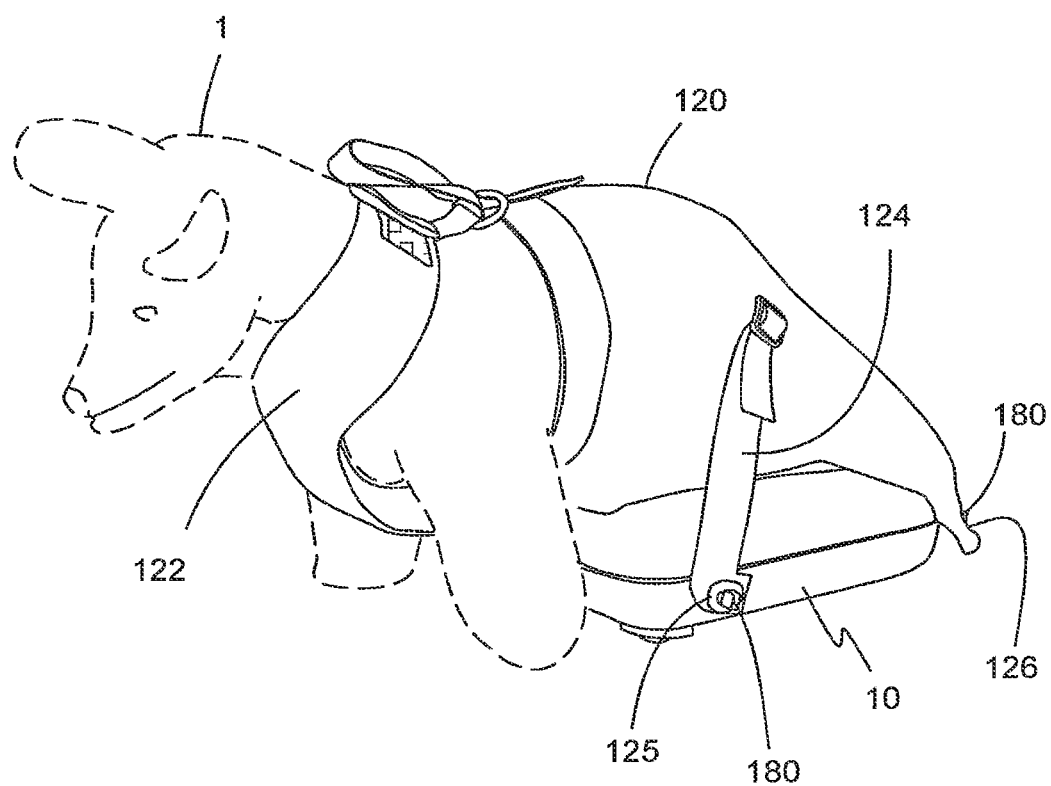
FIG. 9 is a perspective view of a disabled animal with disabled rear legs in an animal rear leg drag bag connected to the pet mobility carrier assembly.

FIG. 9 is a perspective view of a disabled animal 1 connected to pet mobility carrier assembly 10. In this illustration, animal 1 has disabled rear legs, which are placed within a drag bag 120 and secured to animal 1 using a chest strap 122 of drag bag 120 where chest strap 122 connects to itself around the animal's neck. As illustrated, drag bag 120 includes adjustment bag strap 124 with eyelet 125 that is connected to releasable attachment point 180, which is a twist lock fastener, at front end 31 of carrier base 30. Drag bag 120 has an eyelet 125 attached to a corner 126 where eyelet 125 is connected to releasable attachment point 180, which is also a twist lock fastener, at back end 32 of carrier base 30.

Figure 10:
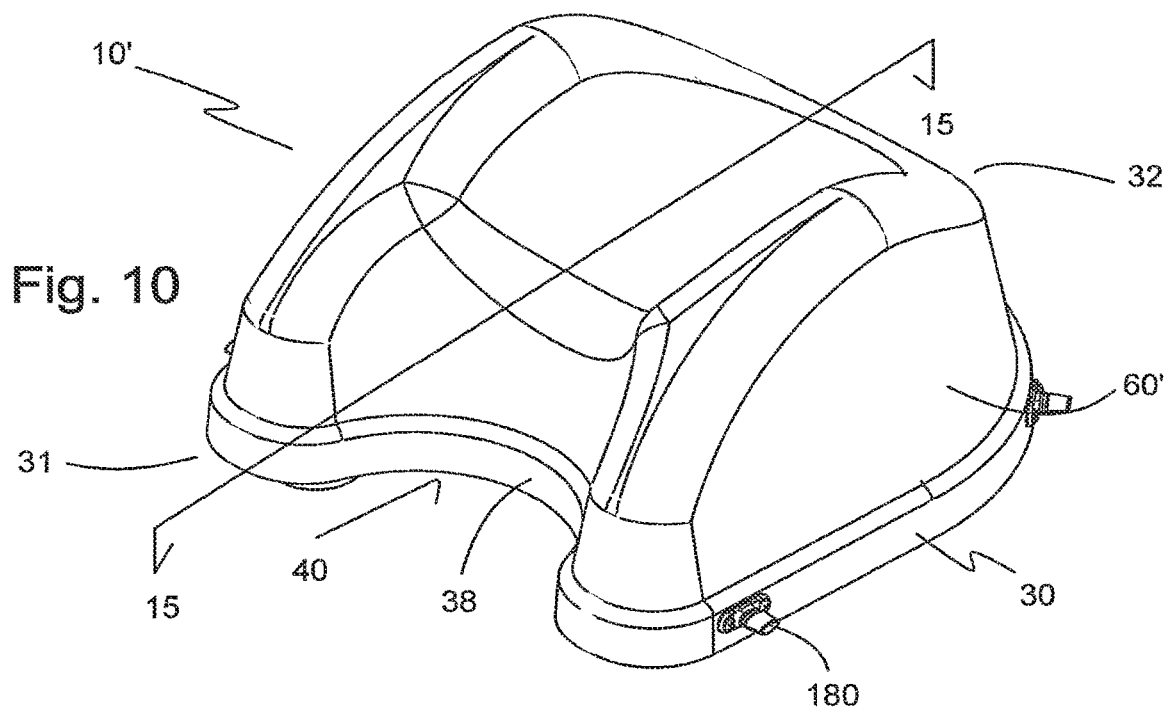
FIG. 10 is a front, left perspective view of another embodiment of the present invention for a disabled animal with disabled front legs.
Figure 11:
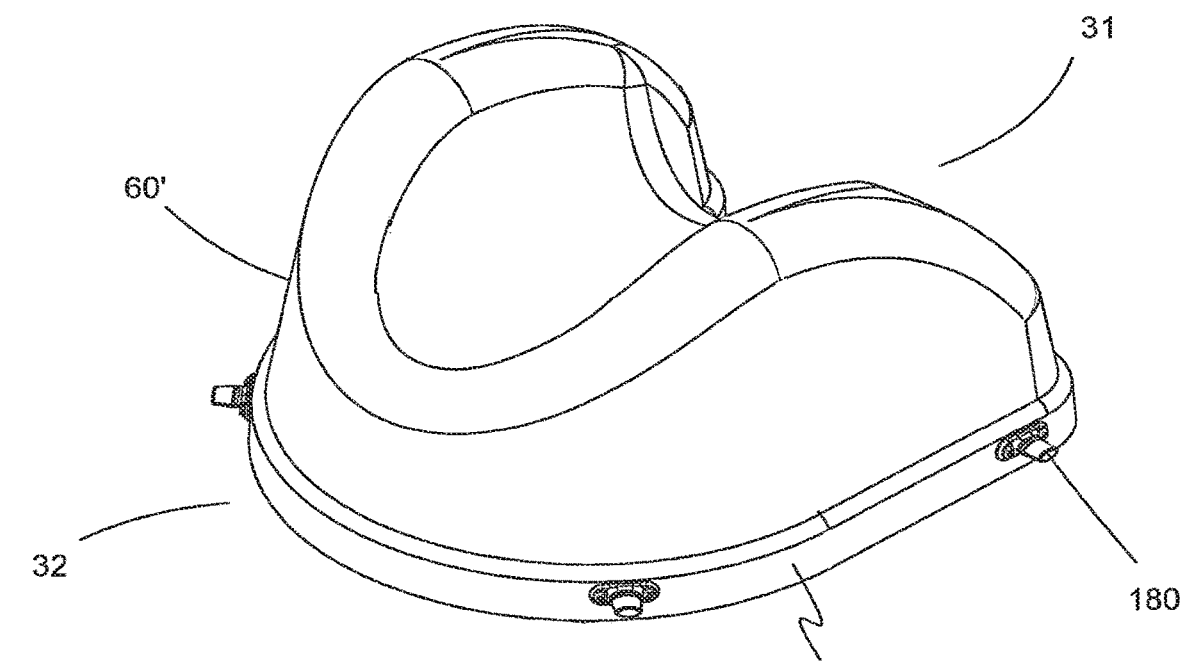
FIG. 11 is a rear, right perspective view of the embodiment of FIG. 10.
Figure 14:
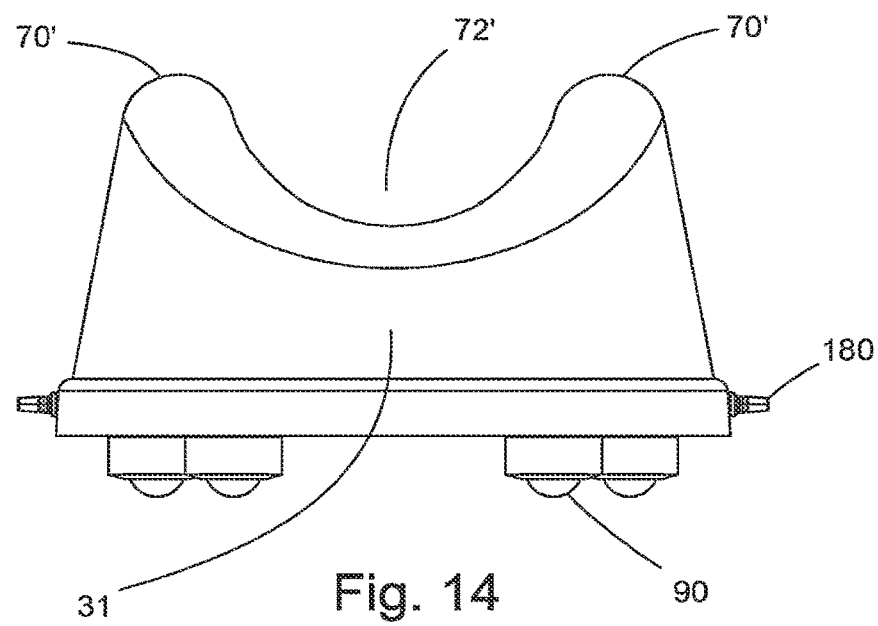
FIG. 14 is a rear view of the embodiment of FIG. 10.
Figure 15:
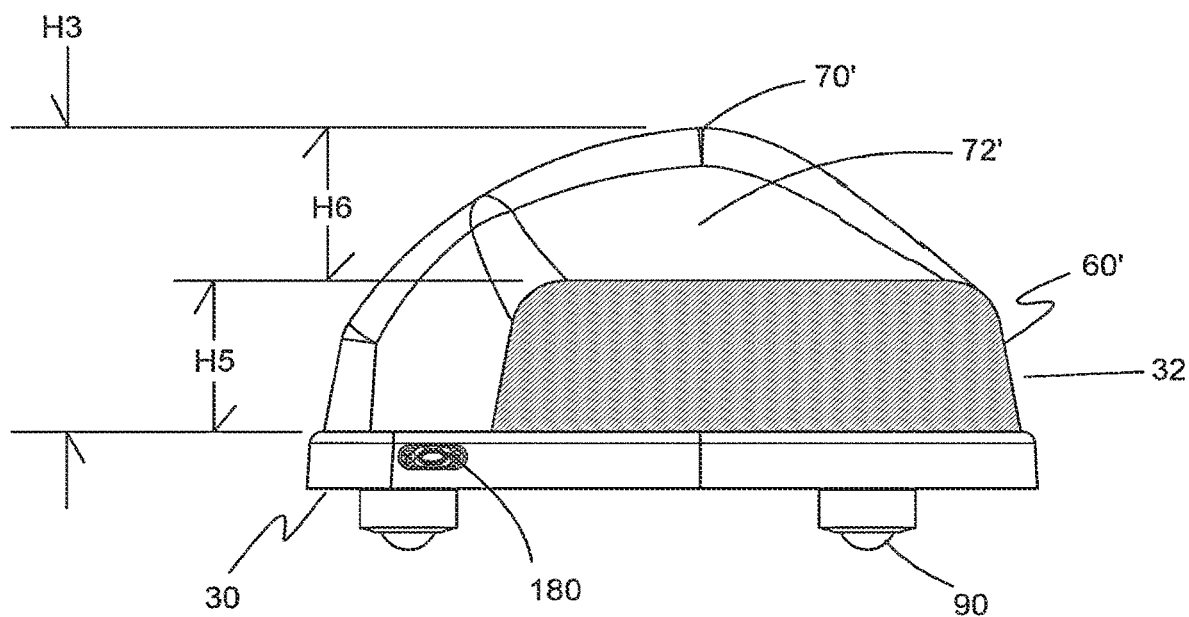
FIG. 15 is a left side view of the embodiment of FIG. 10.
Figure 16:
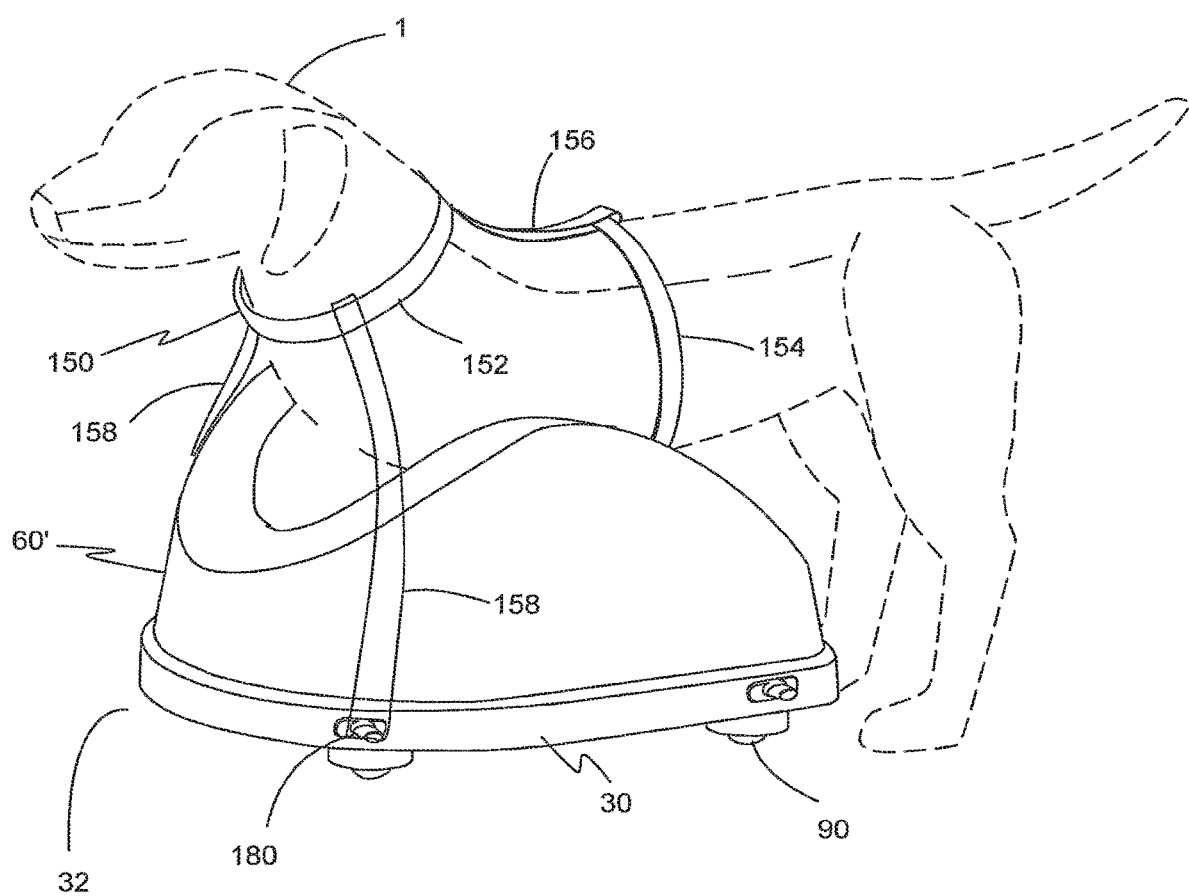
FIG. 16 is a perspective view of a disabled animal with disabled front legs with a harness connecting the disabled animal to the pet mobility carrier assembly.

Turning now to FIGS. 10-16, there is illustrated another embodiment of pet mobility carrier assembly 10' for use with an animal having front disabled legs. FIGS. 10 and 11 illustrate front and rear perspective views of pet mobility carrier assembly 10'. In this embodiment, carrier base 30, rollers 90 and releasable attachment points 180 are the same as those previously discussed and so will have identical reference numbers as previously disclosed. The main difference is the structure of carrier animal support 60'. The difference lies in the height dimensions of carrier animal support 60' to accommodate the front disabled legs and chest of the disabled animal while preserving as close as possible the disabled animal's standing position prior to the animal becoming disabled. Further, as shown in FIG. 16, the disabled animal's non-disabled rear legs are positioned at the back end 34 of carrier base 30.

Pet mobility carrier assembly 10' includes carrier base 30, a carrier animal support 60' and at least three rollers 90 (rollers are shown in FIG. 8). Carrier animal support 60' is connected to carrier base 30 and provides a surface upon which disabled front legs and chest of a disabled animal is positioned. The at least three rollers 90 are connected to the bottom of carrier base 30 and allows pet mobility carrier assembly 10 to move across a surface such as, for example, a floor. On a base perimeter surface 36, there is disposed the plurality of releasable attachment points 180 used to secure the disabled animal to pet mobility carrier assembly 10'.

In this embodiment of carrier animal support 60', carrier animal support 60' has a raised side berm 70' along each side portion 60a of the periphery of carrier animal support 60', which defines a space 72' within a central portion 61' of carrier animal support 60' for receiving the disabled front legs and chest of the disabled animal. It is understood that raised berm 70' is not necessary to the functioning of carrier animal support 60' and a flat, planar surface would also suffice. On front end 31 of carrier base 30 is base recess portion 40 that typically has a radius to accommodate the non-disabled rear legs of the disabled animal when the disabled animal walks moving pet mobility carrier assembly 10'.

Figure 12:
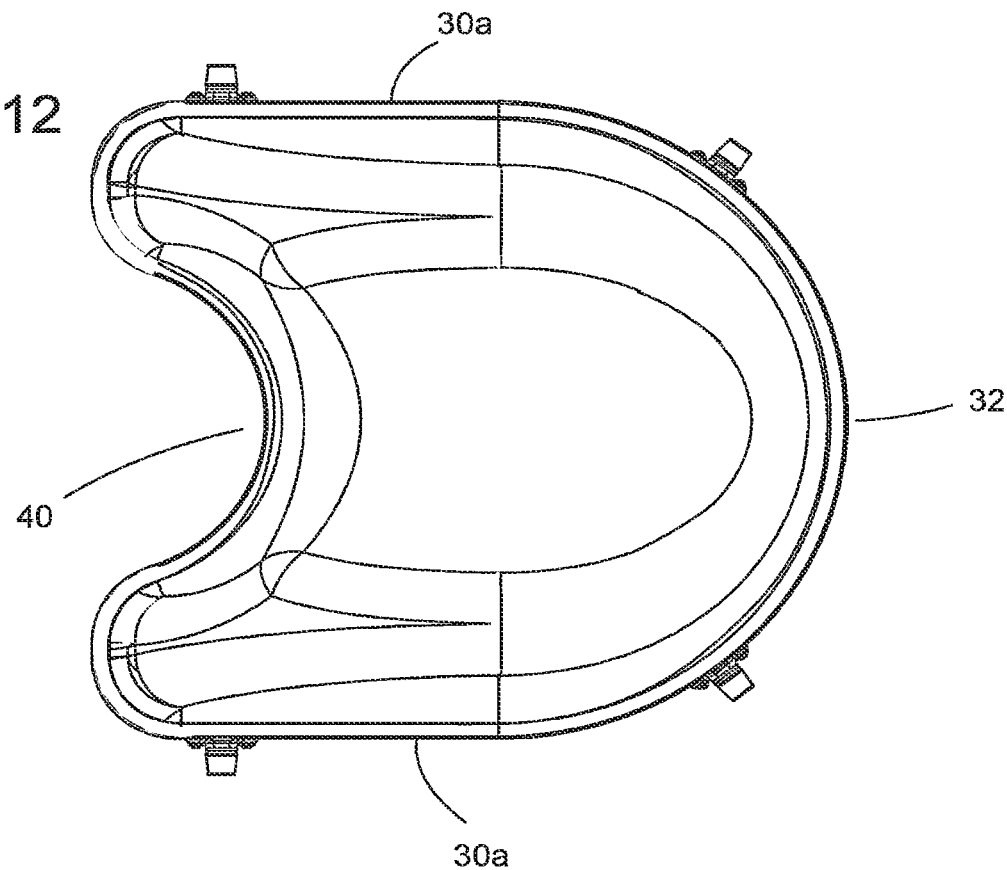
FIG. 12 is a top view of the embodiment of FIG. 10.

FIG. 12 is a top view of pet mobility carrier assembly 10'. As can be seen in this embodiment, the peripheral shape of carrier base 30 has a semi-circular back end 32, parallel sides 30a, and base recess portion 40 having an arcuate, concave shape. As is evident in this embodiment, carrier animal support 60' has a similar shape as carrier base 30. The similarity of the shapes is not important or critical to the present invention. For example, the sides 30a may be parallel to each other along a major portion of the periphery between front end 31 and back end 32 or they may diverge away from each other from back end 32 towards front end 31. Furthermore, back end 32 may be arcuate, multi-sided or perpendicular to sides 30a.

Figure 13:
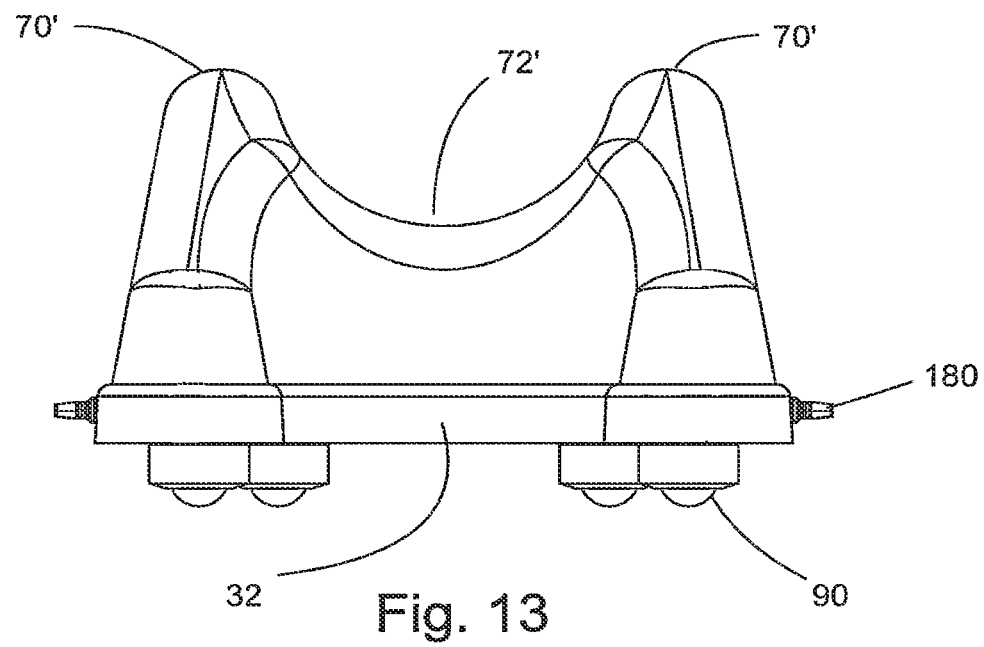
FIG. 13 is a front view of the embodiment of FIG. 10.

FIGS. 13, 14 and 15 are a front view, a rear view and a cross-sectional view of pet mobility carrier assembly 10', respectively. In the front view of FIG. 13, it is shown that raised side berm 70' does not completely surround central portion 61' but delineates an open front portion 62a and an open rear portion 62b that communicates with space 72' between raised side berm 70' which supports the disabled front legs and chest of the disabled animal. Raised side berm 70' helps retain the disabled front legs and chest portion of the disabled animal on the pet mobility carrier assembly 10' as the disabled animal moves along and turns around on a floor. It is understood that the use of pet mobility carrier assembly 10' with its plurality of rollers 90 allows the disabled animal with disabled front legs to move in a generally upright position along a floor allowing the disabled animal greater mobility with much less effort on the part of the disabled animal. The pair of front releasable attachment points 180 are shown to which a restraining assembly is removably secured to front end 31 of carrier base 30. An animal body harness (shown in FIG. 16) is typically used to secure the disabled front legs and/or chest (especially in the case that both front legs have been amputated) to the pet mobility carrier assembly 10'. As shown in FIGS. 13, 14 and 4, the rollers 90 at front end 31 are spaced wider apart than rollers 90 at back end 31. This arrangement provides greater stability to pet mobility carrier assembly 10' when connected to a disabled animal where a greater portion of the animal's non-disabled body extends from carrier assembly 10'.

Turning now to FIG. 15, the cross-sectional view taken along line 15-15 in FIG. 10 shows the cross-sectional shape of carrier animal support 60' as well as cross-sectional view of carrier base 30 that is one design for an injection molded piece. Even more notable is the low form profile of pet mobility carrier assembly 10'. Similar to what is shown in FIG. 7, the heights H1 and H2 in this embodiment between a surface upon which rollers 90 rest and a base bottom 34 of carrier base 30 (also called the clearance height) is the same as that in FIG. 7. The thickness H3 of carrier animal support 60' between a carrier support bottom 64' and a carrier support top 63' is about six inches (about 15.25 cm). The height H4 between a high point of central portion 61' and the highest point of raised side berm 70' is about three inches (about 7.6 cm). The thickness H5 of central portion 61' of carrier animal support 60' from support bottom 64' and the high point of central portion 61' is about three inches (about 7.6 cm). It is understood that these heights and thickness dimensions are not limiting but may be varied depending on the size, leg length (i.e. height) and weight of the disabled animal.

FIG. 16 is a perspective view of a disabled animal connected to pet mobility carrier assembly 10'. In this illustration, animal 1 has disabled front legs. An animal chest harness 150 is used to secure the disabled animal 1 to the pet mobility carrier assembly 10'. As illustrated, animal chest harness 150 includes an adjustable neck strap 152, an adjustable body strap 154, an adjustable back strap 156 connected between adjustable neck strap 152 and adjustable body strap 154. Straps 152, 154 and 156 are adjustable to fit the size and shape of the disabled animal. Also connected to adjustable neck strap 152 are a pair of carrier straps 158 that are adjustable and extend from adjustable neck strap 152 to releasable attachment points 180 at back end 32 of carrier base 30. Carrier strap 158 has, in this embodiment, an eyelet 125 at a carrier strap distal end 159 that is connected to releasable attachment point 180, which is a twist lock fastener as previously disclosed, at back end 32 of carrier base 30.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A mobility carrier assembly for a quadruped having a leg disability, the assembly comprising:
    a carrier base having a plurality of rollers arranged on an underside thereof and configured to permit the assembly to move across an underlying surface; and
    a carrier support removably attachable to the carrier base, wherein the carrier support is configured to have at least one disabled leg of the quadruped positioned thereon, and wherein the carrier base and the carrier support are of similar geometric footprint;
    wherein the carrier base and the carrier support together have formed therein a concave recess configured to accommodate at least one non-disabled leg of the quadruped such that forward or backward movement of the at least one non-disabled leg within at least a portion of the concave recess propels the assembly in a similar direction.

2. The assembly of claim 1, wherein the carrier support includes a raised berm located proximal to a periphery of the carrier support.

3. The assembly of claim 2, wherein the raised berm terminates proximal to at least one end of the concave recess.

4. The assembly of claim 2, wherein the raised berm at least partially encloses a space in a central region of the carrier support, the space being configured to accommodate the at least one disabled leg of the quadruped.

5. The assembly of claim 4, wherein the at least one disabled leg of the quadruped comprises at least one rear leg of the quadruped.

6. The assembly of claim 4, wherein the carrier support is further configured to have at least a portion of a hindquarters of the quadruped positioned on the carrier support within the space in the central region in operation of the assembly.

7. The assembly of claim 1, wherein the carrier support is substantially planar in shape.

8. The assembly of claim 7, wherein the carrier support is generally disc-shaped.

9. The assembly of claim 1, wherein the carrier support includes:
    a first raised berm segment located proximal to a first longitudinal side of the carrier support; and
    a second raised berm segment located proximal to a second longitudinal side of the carrier support which is situated opposite the first longitudinal side of the carrier support.

10. The assembly of claim 9, wherein the first raised berm segment and the second raised berm segment terminate proximal to at least one end of the concave recess.

11. The assembly of claim 9, wherein the first raised berm segment and the second raised berm segment bound a space in a central region of the carrier support, the space being configured to accommodate the at least one disabled leg of the quadruped.

12. The assembly of claim 11, wherein the at least one disabled leg of the quadruped comprises at least one front leg of the quadruped.

13. The assembly of claim 11, wherein the carrier support is further configured to have at least a portion of a chest of the quadruped positioned within the space in the central region in operation of the assembly.

14. The assembly of claim 9, wherein the carrier support is substantially non-planar in shape.

15. The assembly of claim 14, wherein the carrier support is generally saddle-shaped.

16. The assembly of claim 1, wherein the carrier base includes a plurality of releasable attachment points by which the quadruped is securable to the assembly.

17. The assembly of claim 16, wherein the plurality of releasable attachment points is arranged on a perimetral surface of the carrier base.

18. The assembly of claim 16, wherein the plurality of releasable attachment points is configured to have releasably attached thereto one or more straps to secure the quadruped to the assembly.

19. The assembly of claim 1, wherein the plurality of rollers comprises at least three rollers.

20. The assembly of claim 1, wherein the plurality of rollers comprises at least four rollers.

21. The assembly of claim 20, wherein rollers proximal to the concave recess are spaced wider apart from one another than rollers distal to the concave recess.

22. The assembly of claim 1, wherein the concave recess is arcuate in shape having at least one radius of curvature extending inward into a central region of the carrier support.

23. The assembly of claim 1, wherein:
    the carrier base is substantially rigid; and
    the carrier support comprises a cushioning material.

24. The assembly of claim 23, wherein the carrier support comprises a foam pad.

25. A mobility carrier assembly for a quadruped having a leg disability, the assembly comprising:
    a carrier base having a plurality of rollers arranged on an underside thereof and configured to permit the assembly to move across an underlying surface; and
    a carrier support removably attachable to the carrier base, wherein the carrier support is configured to have at least one disabled leg of the quadruped positioned thereon, wherein the carrier support is substantially planar in shape, and wherein the carrier support is generally disc-shaped;
    wherein the carrier base and the carrier support together have formed therein a concave recess configured to accommodate at least one non-disabled leg of the quadruped such that forward or backward movement of the at least one non-disabled leg within at least a portion of the concave recess propels the assembly in a similar direction.

26. A mobility carrier assembly for a quadruped having a leg disability, the assembly comprising:
    a carrier base having a plurality of rollers arranged on an underside thereof and configured to permit the assembly to move across an underlying surface, wherein the carrier base includes a plurality of releasable attachment points by which the quadruped is securable to the assembly, and wherein the plurality of releasable attachment points is configured to have releasably attached thereto one or more straps to secure the quadruped to the assembly; and a carrier support removably attachable to the carrier base, wherein the carrier support is configured to have at least one disabled leg of the quadruped positioned thereon;

wherein the carrier base and the carrier support together have formed therein a concave recess configured to accommodate at least one non-disabled leg of the quadruped such that forward or backward movement of the at least one non-disabled leg within at least a portion of the concave recess propels the assembly in a similar direction.

* * * * *